United States Patent
Hefetz et al.

(10) Patent No.: US 8,700,988 B2
(45) Date of Patent: Apr. 15, 2014

(54) SELECTIVELY INTERPRETED PORTAL PAGE LAYOUT TEMPLATE

(75) Inventors: Eitan Hefetz, Rosh Haain (IL); Aviv Levin, Raanana (IL); Yossi Pik, Tel Aviv (IL); Yaniv Haber, Tel-Aviv (IL)

(73) Assignee: SAP Portals Israel Ltd., Raanana (IL)

( * ) Notice: Subject to any disclaimer, the term of this patent is extended or adjusted under 35 U.S.C. 154(b) by 2045 days.

(21) Appl. No.: 10/628,959

(22) Filed: Jul. 28, 2003

(65) Prior Publication Data

US 2004/0123238 A1   Jun. 24, 2004

Related U.S. Application Data

(60) Provisional application No. 60/435,637, filed on Dec. 20, 2002.

(51) Int. Cl.
*G06F 17/00*          (2006.01)

(52) U.S. Cl.
USPC .......................................... 715/234; 715/200

(58) Field of Classification Search
USPC .............. 715/530, 513, 234, 255, 111, 200; 717/111
See application file for complete search history.

(56) References Cited

U.S. PATENT DOCUMENTS

| | | | | |
|---|---|---|---|---|
| 5,706,502 A * | 1/1998 | Foley et al. | ...................... | 707/10 |
| 6,558,431 B1 * | 5/2003 | Lynch et al. | .................. | 715/513 |
| 6,772,408 B1 * | 8/2004 | Velonis et al. | ................ | 717/100 |
| 7,000,184 B2 * | 2/2006 | Matveyenko et al. | ........ | 715/235 |
| 7,043,460 B2 * | 5/2006 | Deboer et al. | .................. | 706/10 |
| 7,178,101 B2 * | 2/2007 | Tunning | ......................... | 715/236 |
| 7,246,041 B2 * | 7/2007 | Fukuda et al. | ................ | 702/189 |
| 7,246,134 B1 * | 7/2007 | Kitain et al. | .................... | 707/102 |
| 7,266,766 B1 * | 9/2007 | Claussen et al. | .............. | 715/234 |
| 7,287,227 B2 * | 10/2007 | Ries et al. | ...................... | 715/741 |
| 7,295,953 B2 * | 11/2007 | Cox et al. | ....................... | 702/186 |
| 7,313,564 B2 * | 12/2007 | Melamed et al. | ............. | 707/101 |
| 7,316,003 B2 * | 1/2008 | Dulepet et al. | .................. | 717/111 |
| 2002/0065722 A1 * | 5/2002 | Hubbard et al. | ................ | 705/14 |
| 2003/0023632 A1 * | 1/2003 | Ries et al. | ...................... | 707/513 |
| 2003/0233631 A1 * | 12/2003 | Curry et al. | .................... | 717/100 |
| 2004/0090458 A1 * | 5/2004 | Yu et al. | ........................ | 345/760 |
| 2004/0148565 A1 * | 7/2004 | Davis et al. | ................... | 715/501.1 |
| 2004/0167989 A1 * | 8/2004 | Kline et al. | .................... | 709/245 |
| 2005/0076330 A1 * | 4/2005 | Almgren et al. | .............. | 717/113 |

OTHER PUBLICATIONS

Tarin Towers, Dreamweaver MX for Windows and Macintosh: Visual Quickstart Guide, Aug. 22, 2002, Peachpit Press, pp. 1-6.*

* cited by examiner

*Primary Examiner* — Manglesh M Patel
(74) *Attorney, Agent, or Firm* — Mintz Levin Cohn Ferris Glovsky and Popeo, P.C.

(57) ABSTRACT

Systems and techniques to design and deploy portal pages include selectively interpreting a portal page template based on a mode of operation. The interpretation of the portal page template results in presentation of a design-time application operable to edit the portal page template if the mode of operation is design-time, and the interpretation of the portal page template results in presentation of a run-time application operable to interact with portal dynamic content if the mode of operation is run-time. Interpreting the portal page template at design-time can result in code that enables editing of the portal page template being added, and the added code can be client-side scripting that enables addition of a content component to a content container in the portal page template using a drag-and-drop action in a WYSIWYG portal layout editor.

13 Claims, 4 Drawing Sheets

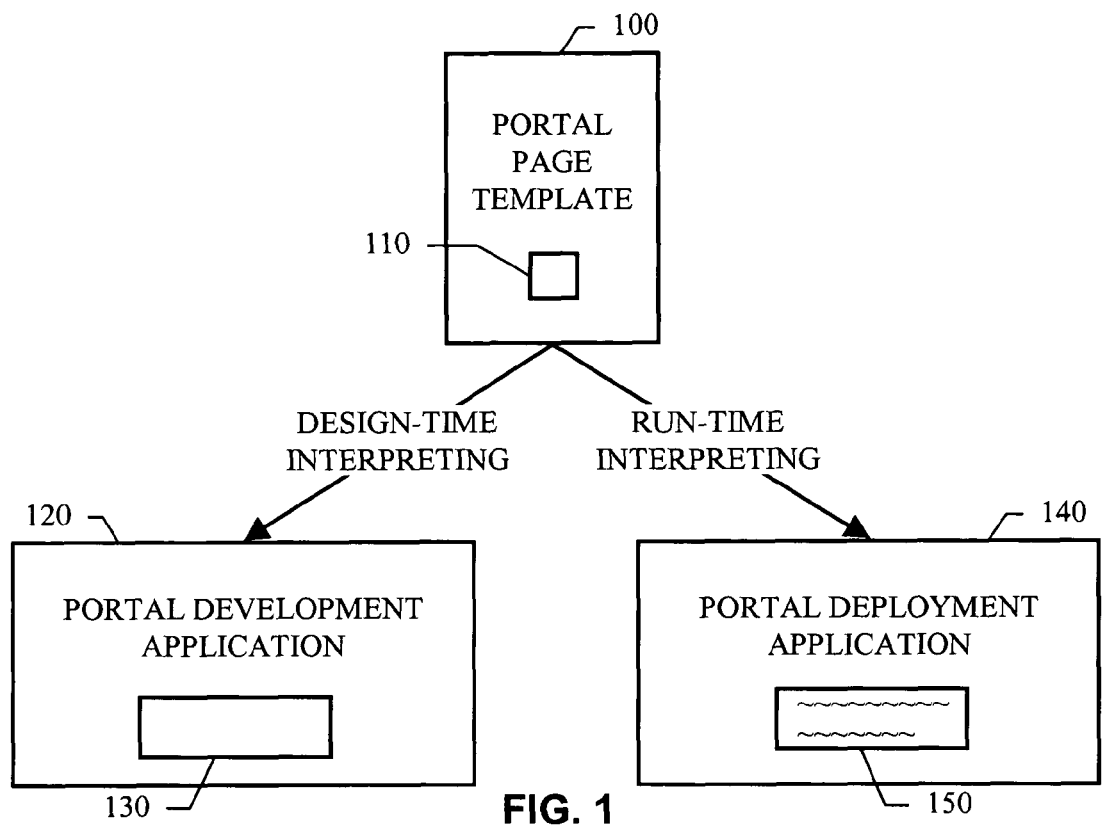
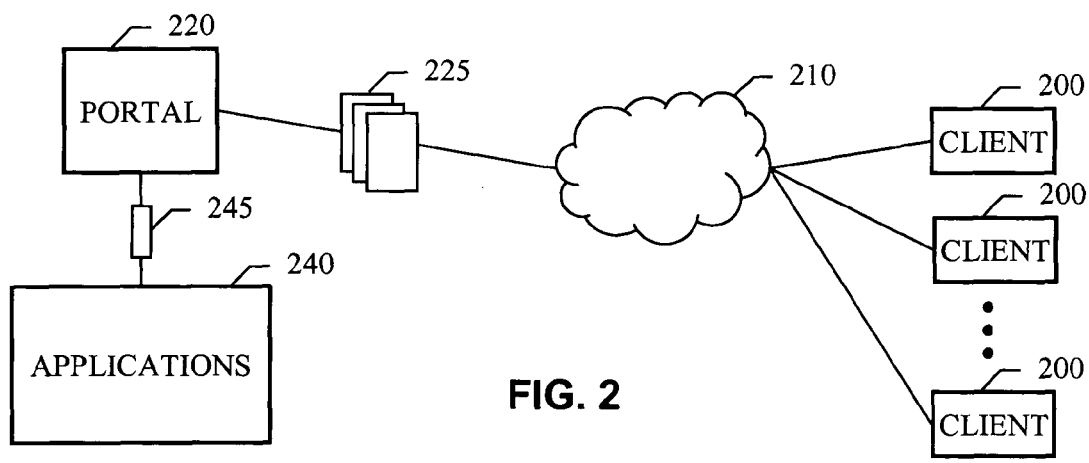

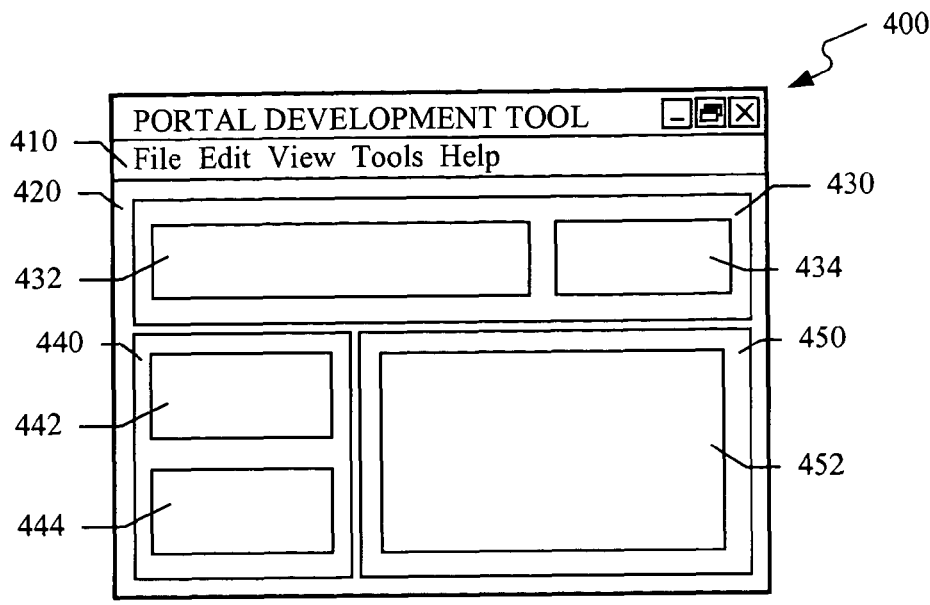

FIG. 4

```
<%@ taglib uri="prt:taglib:tlhtmlb" prefix="hbj" %>
<%@ taglib uri="prt:taglib:tllayout" prefix="lyt" %>
<lyt:template>
<hbj:content id="myContext" >
<hbj:page title="Portal Page">
<H1>Two Columns Layout</H1>
   <hbj:gridLayout  id="myGridLayout1"  width="100%">
      <hbj:gridLayoutCell rowIndex="1" columnIndex="1" width="50%"
         verticalAlignment="top">
        <lyt:container id="column1" orientation="vertical" />
      </hbj:gridLayoutCell>
      <hbj:gridLayoutCell rowIndex="1" columnIndex="2" width="50%"
         verticalAlignment="top">
        <lyt:container id="column2" orientation="vertical" />
      </hbj:gridLayoutCell>
   </hbj:gridLayout>
</hbj:page>
</hbj:content>
</lyt:template>
```

FIG. 5

SELECTIVELY INTERPRETED PORTAL PAGE LAYOUT TEMPLATE

CROSS REFERENCE TO RELATED APPLICATIONS

This application claims the benefit of priority from U.S. Provisional Application entitled "PORTAL PAGE LAYOUT TEMPLATE", filed Dec. 20, 2002, Application Ser. No. 60/435,637.

BACKGROUND

The following description relates to page layout templates, for example, portal page layout templates.

A portal brings together various applications from an intranet and an extranet that may or may not be related to one another. Traditional portal software products have included portal development tools that allow creation of portal templates to be used at portal run-time to generate portal pages for display. Run-time portal templates, such as may be implemented using Java Server Pages (JSP) and custom tag libraries, provide an efficient way to combine static data with dynamic run-time data for presentation to a user in a portal environment.

Portal development tools can be used to edit portal pages and tailor a portal to an organization and its information technology (IT) environment. Editing portal pages generally involves placing content components on the pages. In conventional portal development tools, this editing occurs in a user interface (UI) that provides a schematic representation of a portal page, including a schematic list of containers that hold run-time content. One important consideration while editing a portal page is its exact run-time appearance. Matters such as components' actual sizes, reciprocal relations between content components' appearances, and interaction between content components and other HTML (HyperText Markup Language) elements on the page, are typically taken into consideration. Traditionally, a run-time portal template is generated and used in a full run-time environment, with back-end systems connected to provide run-time content, in order to test the actual run-time appearance of a portal page.

SUMMARY

The present application describes systems and techniques relating to portal page design and deployment. In general, these systems and techniques involve providing a template-based page-layout used to render a document at run-time and at design-time and to provide a WYSIWYG (What You See Is What You Get) presentation of the document while editing the document at design-time. The systems and techniques described here can provide a simple, easy to maintain and flexible mechanism to provide fully WYSIWYG portal page layout templates that can be used at design-time and run-time. Thus, these systems and techniques enable a developer to easily and efficiently create portal pages with the desired look and content arrangement.

A portal development tool can provide a GUI (graphic user interface) WYSIWYG portal template editor. The same portal template can be used by the template editor at design-time, while the template is being created, and by a server at run-time, when the template is deployed to portal users. Components of the portal template can be rendered the same at design-time as they are at run-time, with the exception that, at design-time, portal dynamic content in content containers can be replaced by a representation of the dynamic content. But the look-and-feel, content sources, arrangement, and interrelations of the content containers can be rendered the same at design-time and run-time, providing a design-time WYSIWYG capability for defining portal pages.

Thus, the portal designer can essentially see the actual structure and appearance of a page at design-time along with the other elements (e.g., HTML tags and components, images, etc.) that are placed in a template, except for the run-time content itself, which is generally not determinable until run-time. Moreover, development and deployment of a dynamically generated portal page can be accomplished using a single template that is fully open to different page components (e.g., open to all HTML components). Among other advantages, this can result in simpler portal page generation and maintenance and allows easy two-track portal development, where one group develops the portal presentation and another group develops the application logic used to access databases, enterprise services, and backend systems generally.

In one aspect, a technique, which can be implemented in a software product, involves providing a design-time translator and a run-time translator that both correspond to a defined page element. Then, during design-time for a page, invoking the design-time translator for a page template including the defined page element having one or more content components, where this invoking results in the defined page element in the page template being translated into a representation of the one or more content components in the page, and then during run-time for the page, invoking the run-time translator for the page template, where this invoking results in the one or more content components being obtained and the defined page element in the page template being translated into a presentation of the obtained one or more content components. Invoking the design-time translator can result in presentation of a WYSIWYG layout editor using the representation of the one or more content components in the page.

Moreover, invoking the design-time translator can also result in client-side scripting components being included in the representation to form at least part of the WYSIWYG layout editor, and this can enable adding a content component to a content container using a drag-and-drop action. The page template can be a portal page template, and the WYSIWYG layout editor can be a WYSIWYG portal page layout editor. The defined page element can be a custom Java Server Page tag, the design-time translator and the run-time translator can be Java Server Page tag handlers for the custom Java Server Page tag, and the run-time translator can obtain portal dynamic content according to the portal page template whereas the design-time translator need not do so.

In another aspect, a technique, which can be implemented in a software product, involves translating a placeholder in a portal template, during design-time of a portal page, into a representation of a container designed to present portal dynamic content associated with the placeholder, and presenting a WYSIWYG portal layout editor using the representation of the container designed to present the portal dynamic content. Then, during run-time of a portal page, obtaining the portal dynamic content from a dynamic content source, and translating the placeholder in the portal template into a presentation of the container and the obtained portal dynamic content. Translating the placeholder during design-time can involve adding code enabling editing of the portal page, where the added code forms at least part of the WYSIWYG portal layout editor. The added code can include client-side scripting that enables addition of a content component to a content container in the portal page using a drag-and-drop action. The placeholder can be a custom Java Server Page tag, translating the placeholder during design-time can involve invoking a design-time Java Server Page tag handler corresponding to the custom Java Server Page tag, and translating the placeholder during run-time can involve invoking a run-time Java Server Page tag handler corresponding to the custom Java Server Page tag.

In another aspect, a technique, which can be implemented in a software product, involves selectively interpreting a portal page template based on a mode of operation, where the interpreting results in presentation of a design-time application operable to edit the portal page template if the mode of operation is design-time, and the interpreting results in presentation of a run-time application operable to interact with portal dynamic content if the mode of operation is run-time. Selectively interpreting the portal page template can involve providing a design-time translator and a run-time translator that both correspond to a defined page element. Then, during design-time, invoking the design-time translator for the portal page template including the defined page element having one or more content components, where this invoking results in the defined page element in the portal page template being translated into a representation of the one or more content components in the page, and during run-time, invoking the run-time translator for the page template, where this invoking results in the one or more content components being obtained and the defined page element in the page template being translated into a presentation of the obtained one or more content components.

Invoking the design-time translator can also result in client-side scripting components being included in the representation to form at least part of the design-time application and enable adding a content component to a content container in the portal page template using a drag-and-drop action. As before, the defined page element can be a custom Java Server Page tag, the design-time translator and the run-time translator can be Java Server Page tag handlers for the custom Java Server Page tag, and the run-time translator can obtain portal dynamic content according to the portal page template, whereas the design-time translator need not do so.

In yet another aspect, a portal system includes a WYSIWYG portal layout editor that uses a selectively interpreted portal page template to reveal a WYSIWYG layout context for portal dynamic content without obtaining the portal dynamic content. The portal system also includes a first tag handler implementing a first custom action for a custom tag during portal design-time, where the WYSIWYG portal layout editor uses the first tag handler with the selectively interpreted portal page template to facilitate editing of the selectively interpreted portal page template, and a second tag handler implementing a second custom action for the custom tag during portal run-time, where the portal system uses the second tag handler during portal run-time to obtain and reveal the portal dynamic content. The first tag handler can interpret the portal page template by including client-side scripting that enables addition of a content component to a content container in the portal page template using a drag-and-drop action. Finally, the defined page element can be a custom Java Server Page tag with corresponding Java Server Page tag handlers that obtain portal dynamic content according to the portal page template during run-time but not during design-time, as mentioned above.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 1 is a block diagram illustrating selective interpretation of a portal page layout template.

FIG. 2 illustrates a portal-based networked environment.

FIG. 4 shows an example portal layout in a portal development tool.

FIG. 5 shows an example portal layout template.

Like reference symbols in the various drawings indicate like elements.

DETAILED DESCRIPTION

Figure 3:
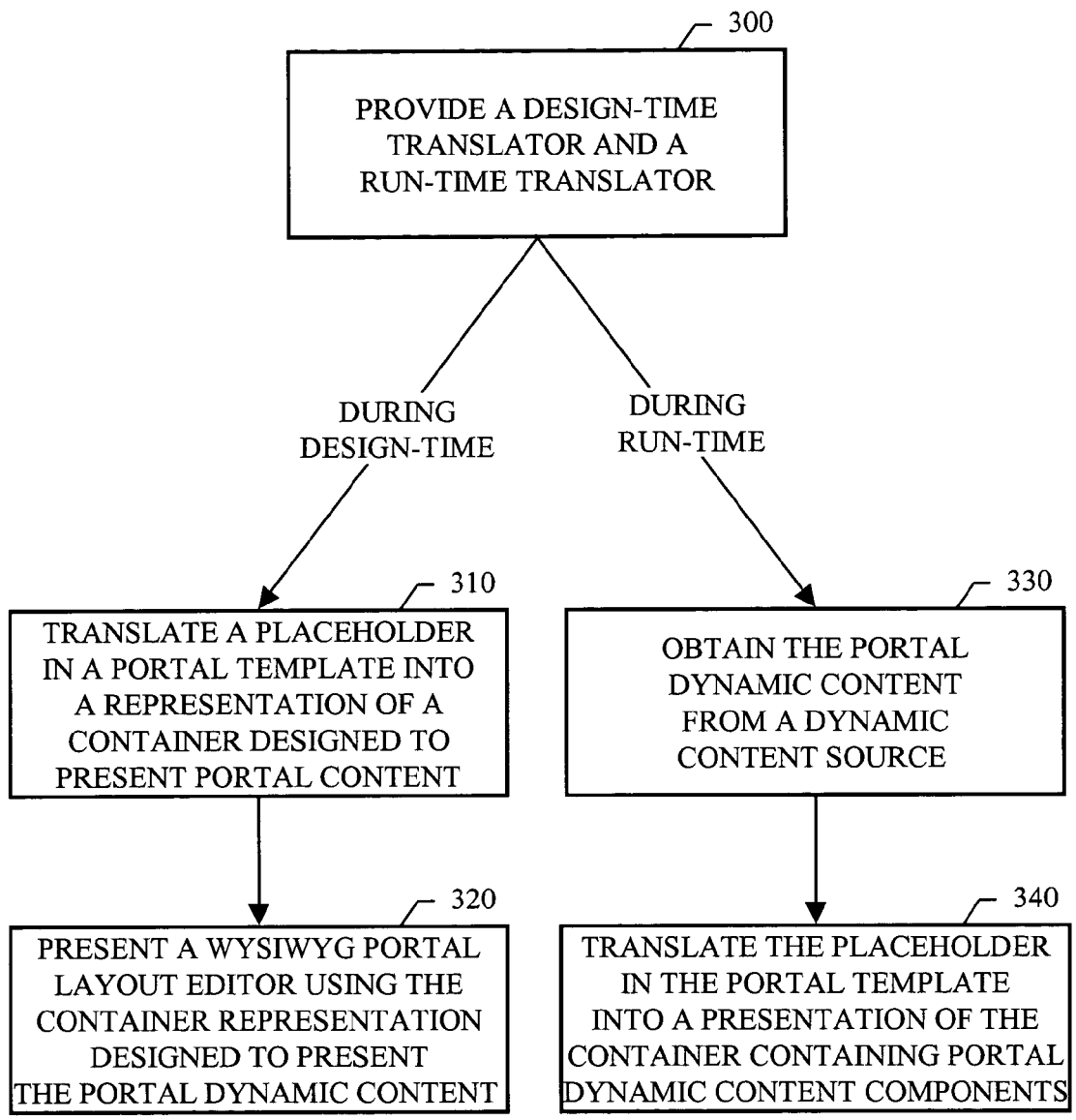
FIG. 3 is a flowchart illustrating selectively interpreting a portal page layout template.

The systems and techniques described here relate to portal page design and deployment and can be used to provide fully WYSIWYG (What You See Is What You Get) portal page layout templates. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

The term "page" refers to an electronic document designed for use in presenting information over a network, and is not limited to web pages or JSP pages. The term "static content" refers to page content with run-time behavior that is generally determinable at design-time, including images, text, and HTML components generally, including HTML that exhibits dynamic behavior on a client (e.g., Dynamic HTML) or other server-side or client-side code/scripts that result in dynamically generated content on a page. The term "dynamic content" refers to page content with run-time behavior that is not readily determinable at design-time because the content comes from a dynamic content source, such as an application database, and the content may be personalized based on a current user of the portal and any associated roles for that user.

In a portal environment, the systems and techniques described can be implemented to provide a template-based page-layout capability such that the layout can execute both at run-time and design-time. The template can use elements to set the general page structure (e.g., HTML elements such as the <table> element). Dedicated tag-based placeholders can mark the location for content components' containers. Those placeholders can be replaced with the actual components' content at run-time and with components' representation at design-time. Content components that can be determined at design-time are displayed in a WYSIWYG manner at design-time. Dynamic content components that cannot be determined at design-time are replaced with stand-in representations that are displayed during design-time in place of the dynamic content components. This capability to selectively interpret some template elements but not others is referred to as "selective interpretation" of a portal page.

FIG. 1 is a block diagram illustrating selective interpretation of a portal page layout template 100. The portal page template 100 is an electronic document that can be used both during portal design and portal deployment. The template 100 can include a placeholder 110 that can be used to specify portal dynamic content components for a presentation to be generated using the template 100. During design-time, the template 100 can be interpreted to present a design-time portal development application 120. This design-time application 120 includes a user interface that displays a representation 130 of the dynamic content components. The representation 130 shows the layout context of the dynamic content, including the surrounding static content as it appears at run-time, without needing to obtain and present the dynamic content itself.

The design-time application 120 can be used to edit the template 100, and to generate new templates as desired, including specifying dynamic content sources. The design-time application 120 provides a design-time WYSIWYG presentation of portal pages while editing the templates used to generate those portal pages. Open templates can be readily developed during design-time in a portal environment, and the portal developer need not switch to a run-time scenario to see what the final run-time presentation will look like. The final run-time presentation is fully represented in the design-time presentation, even though the dynamic content may be neither obtained nor shown during design-time. Consequently, the design of portal pages can proceed quickly and efficiently without requiring connection and communication with a backend system to provide dynamic content.

Moreover, the UI of the design-time application 120 can be generated in part using the placeholder 110 in the template 100. When the template 100 is parsed and interpreted at design-time, the placeholder 110 can be interpreted to represent a container of actual content components by creating a run-time-look-alike representation of the content component with code enabling editing of the page. For example, the placeholder 110 can be filled with HTML components having client-side scripting that enables dragging components on the content container and later saving the changes made. Thus, the view of the page generated at design-time using the template document can be used as part of the WYSIWYG page editor that facilitates editing of the template itself. The WYSIWYG page editor can also include a list of all run-time content-presentation components currently available in the portal system, which can be dragged into and dragged out of content containers as desired in the GUI of the WYSIWYG page editor.

During run-time, the same template 100 can be interpreted to present a run-time portal deployment application 140. The run-time application 140 communicates with one or more dynamic content sources to obtain and present dynamic content in a UI presentation 150. The UI presentation 150 corresponds to the design-time representation 130, but also includes the actual dynamic content. The run-time application 140 can include functionality as specified by the portal developer and can enable a portal user to interact with the portal dynamic content in various ways.

The placeholder 110 specifies a location for dynamic content. During design of the template 100, the placeholder 110 can be interpreted as a content components container to be filled with components representation rendered as empty components in a UI. Then, at run-time, the placeholder 110 can be interpreted as a content container that runs live content components connected to a dynamic content source. The remainder of the template content (e.g., HTML and other code elements) can be executed and rendered the same at run-time and design-time. Thus, a single template can be created and used both at design-time and run-time. The template can provide WYSIWYG layout for portal pages at design-time and can ensure that the user sees the same representation of a page both at design-time and run-time, with the only difference being that dynamic content is represented by a content container and not actually presented at design-time. Moreover, the content container can be used at design-time for editing layout purposes.

The template can be an open template that fully allows a portal developer to add content to the template as desired. For example, the template can be implemented as a JSP page, where the portal developer can add HTML content as desired and define custom JSP actions. When the template is fully open to content additions, providing the WYSIWYG portal layout editor at design-time can significantly reduce portal development and testing time. The WYSIWYG portal layout editor provides an easy way to know, at design-time, how a page will look and feel at run-time without having to be connected to a backend system or having to run the dynamic run-time content.

FIG. 2 illustrates a portal-based networked environment. Multiple clients 200 can access data over a network 210 through a portal 220. The network 210 can be any communication network linking machines capable of communicating using one or more networking protocols, e.g., a local area network (LAN), a wide area network (WAN), an enterprise network, a virtual private network (VPN), a mobile device network and/or the Internet. The clients 200 can be any machines or processes capable of communicating over the network 210. The clients 200 can be web browsers and can be communicatively coupled with the network 210 through a proxy server.

The portal 220 provides a common interface to applications 240. The portal 220 receives requests from the clients 200 and uses portal templates to generate information views 225 (e.g., web pages) in response. The portal 220 can implement a user-roles based system to personalize the common interface and the information views 225 for a user of a client 200. A user can have one or more associated roles that allow personalized tailoring of a presented interface through the generated information views 225. The portal 220 can receive information 245 from the applications 240 to fulfill requests from the clients 200; this information can be dynamic content and the applications 240 can be dynamic content sources.

The portal 220 can be integrated with an enterprise management system that consolidates multiple application services. The integrated enterprise management system can provide integrated application services to manage business objects and processes in a business enterprise. The business objects and processes can be resources (e.g., human resources), development projects, business programs, inventories, clients, accounts, business products, and/or business services.

The applications 240 can be many types of information sources, including web services, document repositories, and/or enterprise base systems, such as human resource management systems, customer relationship management systems, financial management systems, project management systems, knowledge management systems, business warehouse systems, time management systems, and electronic file and/or mail systems. The integrated enterprise management system can also include an integration tool, such as the exchange Infrastructure provided by SAP of Walldorf, Germany. The integrated enterprise management system can consolidate and integrate the data and functionality of multiple different applications into a single enterprise management tool provided through the portal.

An enterprise portal and associated enterprise base systems can reside in one or more programmable machines, which can communicate over a network or one or more communication busses. For example, the enterprise portal can reside in one or more servers connected to a public network and can run one or more server software programs. The enterprise portal can include a portal platform in communication with a navigation platform accessed by the user. The portal platform can include a web server, a page builder, and an information view (AKA, integration view or iView) server. The portal platform can also include a unification server, user management components (e.g., a Corporate LDAP (Lightweight Directory Access Protocol) Directory and a Portal LDAP Directory), and a database repository. The database repository can include an SQL (Structured Query Language) Database and a Portal Content Directory (PCD).

The database repository and user management components form at least part of a persistency layer for storage of the portal platform's metadata. Moreover, the enterprise portal can include, or be in communication with, various other enterprise systems, such as a knowledge management platform, a text retrieval and extraction server, and a business warehouse platform. The knowledge management platform can be software for data preparation, including workflow, publishing, feedback, analysis, discussion, querying, indexing, profiling, concurrency control, and classification functionality.

The portal 220 can be a portal software product that includes out-of-the-box portal templates and portal development tools that can be used to create portal templates. These tools can be used by a portal developer and/or administrator to design and deploy a portal in a particular IT environment, and these tools include a WYSIWYG portal page editor. Dynamic content components of a portal page can be specified in a portal template using selectively interpreted content placeholders. At design-time, the portal need not be connected to a backend system and need not actually receive dynamic content. Other content components of the portal page can be included in the portal template and run in the same manner at design-time as they will be at run-time. For example, the design-time application used to edit portal templates can run the template inside a browser client, with dynamic content being withheld and other content being executed inside the browser client in the same manner as at run-time. Thus, the portal designers can edit portal pages from the clients 200 using the WYSIWYG portal page editor provided by the portal 220.

The same template can be used both at design-time, including during design of the template itself, and at run-time. At design-time, the presentation corresponds directly to what will be presented at run-time, with the exception of the actual run-time content being withheld. This portal design architecture facilitates WYSIWYG behavior, makes portal pages easier to create and maintain, and facilitates a simple two-track portal development process, where one group develops the portal presentation and another group develops the application logic used to access databases, enterprise services, and backend systems generally.

FIG. 3 is a flowchart illustrating selectively interpreting a portal page layout template. A design-time translator and a run-time translator can be provided at 300. The two translators correspond to the same defined page element or placeholder, and are invoked based on a current mode of operation. For example, the defined page element can be a custom JSP tag and the two translators can be JSP tag handlers corresponding to a design-time operation mode and a run-time operation mode.

During design-time, a placeholder in a portal template can be translated at 310 into a representation of a container designed to present portal content. The container representation shows the layout context for the portal content that will be obtained and revealed at run-time. The container representation can also directly present dynamic content source information for the content container. A WYSIWYG portal layout editor is presented at 320 using the container representation designed to present the portal dynamic content. The WYSIWYG portal layout editor facilitates editing of the portal template and thus the resulting portal page(s).

During run-time, the portal dynamic content can be obtained at 330 from a dynamic content source. The placeholder in the portal template can be translated at 340 into a presentation of the container containing the obtained portal dynamic content component(s). Thus, at run-time, the portal page is presented with its portal dynamic content according to the portal template created using the WYSIWYG portal layout editor. By using a file-based template with placeholders for containers that are content blocks at both design-time and run-time, dynamic content containers can be located in a layout as desired during editing of the layout, while the actual run-time look and feel of the resulting page is shown in the WYSIWYG portal layout editor. A run-time application can parse and locate the placeholders in the template and replace them with the run-time content components, and at design-time, the same template can be parsed and rendered with a representation of the content components, in place of the actual run-time content components, to reveal the run-time layout during design of the template. Using various relative methods for laying out components in the template, such as using percentage division of horizontal space (i.e., use HTML Columns with widths set by percentage), enables maintaining run-time presentation, even when the template is presented within the design-time editing tool (thus this captures less screen space).

FIG. 4 shows an example portal layout 420 in a portal development tool 400. The tool 400 can be part of the portal software and can include a UI with portal page editing features, which can be accessed through a tool bar 410 or through other graphical interface features of the user interface. For example, the portal development tool 400 can include drag-and-drop UI features to facilitate design of portal pages, including dragging and dropping dynamic content source information into graphical containers representing dynamic content in a portal layout.

The portal layout 420 includes three containers for dynamic content components 430, 440, 450. A dynamic content container can hold one or more presentation components that deliver dynamic run-time content. A run-time content-presentation component can be an iView, which is a small application that displays information and may constitute the basic unit of portal content. Thus, the dynamic content container 430 can include two side-by-side iViews 432, 434, the dynamic content container 440 can include two stacked iViews 442, 444, and the dynamic content container 450 can include a single iView 452.

The portal development tool 400 can be used to create and show the relations between the different content components, including how they relate to the applications that provide the dynamic content. For example, a portal developer may create a template with two iViews: a first iView on the left in a narrow column with a list of items to select, and a second iView on the right in a wide column with details of a current item selected in the list. The portal developer can readily select which components to place on a page, set permissions and/or attributes for user-specific personalization, specify the layouts of multiple portal pages by defining the portal templates in the GUI that presents visual representations of the portal pages to be generated at run-time using the templates, and set the structure of the content components in the templates.

The portal layout 420 has a corresponding portal template that is used both at design-time and run-time, and that includes dedicated tags to set placeholders for the containers that hold the dynamic content components. At run-time, the placeholders are replaced with the actual components presenting their content, while at design-time the placeholders present content components' respective representations to simulate the run-time presentation. The general structure of the portal page can be specified using traditional HTML tags, such as <table>, or using custom tags. A portal template created using the portal development tool 400 can contain various HTML elements and/or additional code, which is rendered and presented both at run-time and design-time.

A single template file can be used for both run-time and design-time. Using the same layout template for both run-time (presenting the actual page to the user) and design-time (editing the page content), provides a create-once-use-twice solution. With this one template for design-time and run-time, the portal developer sees, at design-time and during portal development, all the static content that has been specified for the page. This portal template architecture enables easy portal development and maintenance, and helps to ensure that the same portal appearance is presented both at run-time and at design-time.

FIG. 5 shows an example portal layout template 500. The example layout template 500 is a Java Server Page layout template with custom tags and associated tag libraries. The JSP template can contain any HTML, Java, custom tags defined in a tag library, or other JSP complying content, to be included in the portal page. This can include server-side code run to add additional components to the generated page, and such dynamically generated content can also be seen at design-time as it will be seen at run-time.

The content components' containers' placeholders can be marked using a <lyt:container> tag and a dedicated tag library. The <lyt:container> tag, located in the JSP, can mark a place for a column of content components. For example, the layout template 500 describes a two column layout with two <lyt:container> tags 520, 530 that correspond to dynamic content components. The <lyt:container> tag is defined in a tag library specified with a taglib directive 510, which points to the tag library definitions.

The tag library provides two different tag handler implementations for the <lyt:container> tag: a run-time tag handler and design-time tag handler. The run-time tag handler obtains and presents the content components' respective run-time generated content. The design-time tag handler paints a run-time-look-alike representation of each content component with code enabling editing of the page (adding, removing, re-locating components). All other JSP content can be rendered the same at both design-time and run-time.

A layout container can hold multiple iViews, and the arrangement of layout containers on the page can be set by the JSP HTML wrapping the <lyt:container>, as specified by a portal developer. In the example shown, the template also includes another tag library defining various custom <hbj> tags. These tags correspond to a markup language called HTMLB (HTML-Business for Java), which is provided by SAP of Walldorf, Germany. HTMLB provides a full set of easy-to-use web controls. Traditional HTML can also be used to accomplish the same effects.

The <lyt:container> tag includes an id attribute 540, which identifies the content container. Additional content container properties can be included as attributes, such as with the orientation attribute shown, or stored elsewhere, such as in a common XML (eXtensible Markup Language) document that stores portal application definitions. For example, the portal definitions document can include XML, such as the sample below, which contains only one layout template with one container.

```
<?xml version="1.0" encoding="ISO-8859-1"?>
<application>
   <application-config>
      <property name="SharingReference" value="htmlb,UserAgentToolbox,pagebuilder"/>
   </application-config>
   <components>
      <component name="fullWidth">
         <component-config>
            <property name="ClassName" value="com.sapportals.portal.pb.layout.PageLayout"/>
            <property name="ResourceBundleName" value="pagebuilder_nls"/>
         </component-config>
         <component-profile>
            <property name="ComponentType" value="com.sapportals.portal.layout"/>
            <property name="com.sap.portal.pcm.Title" value="1 Column (Full Width)"/>
            <property name="com.sap.portal.pcm.Description" value="Layout displaying one full-width column"/>
            <property name="com.sap.portal.reserved.layout.TagLibLayout"
                      value="/SERVICE/com.sap.portal.pagebuilder/taglib/layout.tld"/>
            <property name="com.sap.portal.reserved.layout.TagLibHtmlb"
value="/SERVICE/htmlb/taglib/htmlb.tld"/>
            <property name="com.sap.portal.reserved.layout.TemplateFile" value="fullWidth.jsp"/>
            <property name="com.sap.portal.reserved.layout.Cont1" value="the_container_id">
               <property name="title" value="my first container"/>
               <property name="orientation" value="vertical"/>
               <property name="designClass" value="prtlPageConF"/>
            </property>
         </component-profile>
      </component>
   </components>
   <services/>
</application>
</p>
```

Several layout templates with several containers in each can be defined by duplicating the relevant XML sections. The underlined portions of the sample XML data above indicate the XML portions that can be modified for different templates. The <component name="fullWidth"> defines the component (layout) name, as with other portal components. The <property name="com.sap.portal.pcm.Title" value="1

Column (Full Width)"/> defines the layout title to be displayed in the WYSIWYG portal layout editor, as with other portal components. The <property name="com.sap.portal.pcm.Description" value="Layout displaying one full-width column"/> defines a description for the layout. The <property name="com.sap.portal.reserved.layout.TemplateFile" value="fullWidth.jsp"/> defines the name of the layout-template JSP file for this specific component (this can be a path and file name relative to a defined portal directory).

The <property name="com.sap.portal.reserved.layout.Cont1" value="the_container_id"> defines the container ID for this container. The names used for these container IDs can be limited to names with a sequential ContX suffix (e.g., Cont1, Cont2, . . . ). The <property name="title" value="my first container"/> defines the container title to be used in the WYSIWYG portal layout editor. The <property name="orientation" value="vertical"/> defines container orientation. The <property name="designClass" value="prtlPageConF"> defines the access class to be used by the HTML table created by the container (<table class=" . . . ">), and enables control of container styling properties (e.g., padding, spacing, etc.).

A <lyt:template> tag 550 can be used to effect the selective interpretation of the <lyt:container> tags. The <lyt:template> tag 550 can provide a utility scripting variable that serves two tasks. First, the scripting variable can enable differentiating code segments according to the requesting user agent (e.g., browser type, version, etc.). A portal UserAgent service can be accessed to detect the user agent in use. Second, the scripting variable can be used to resolve whether the JSP layout template is currently used for run-time or design-time purposes, and can condition code accordingly. A RunMode parameter can enable differentiating code segments according to the current use of the template: run-time page deployment, or design-time page editing in the WYSIWYG page layout editor. Below is an example of a full page JSP with use of a scripting variable highlighted with underlining.

Figure 6:
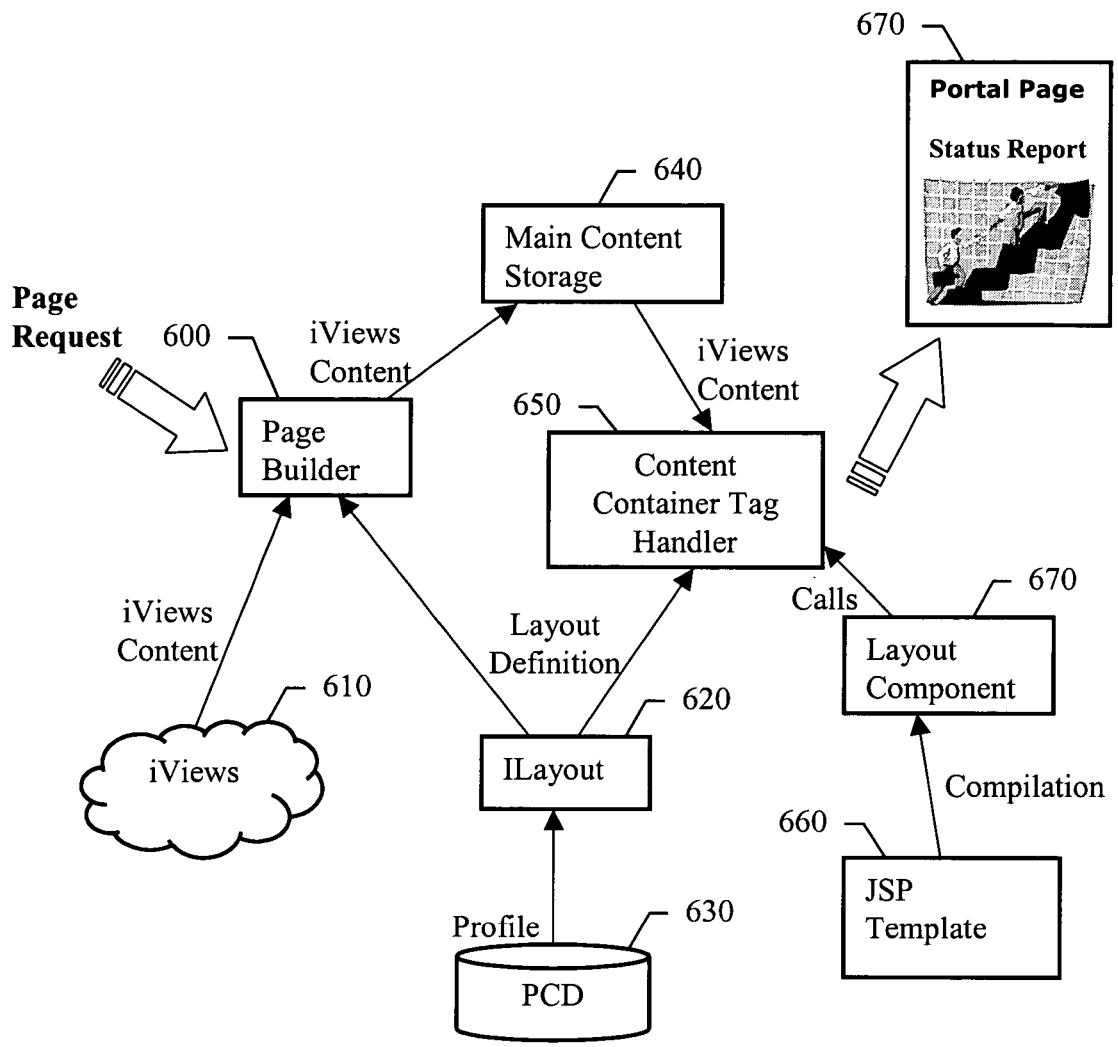
FIG. 6 shows an example portal page builder architecture.

FIG. 6 shows an example portal page builder architecture. A page builder 600 receives a page request, and in response to the request, the page builder 600 fetches dynamic run-time content and invokes a layout component 670 to construct the full page. The layout component 670 can be an abstract portal component that is generated from a JSP template 660. The JSP template 660 defines the general structure/design of the page layout, and page layout definitions for the JSP template 660 can be stored in a PCD (Portal Content Directory—metadata repository implementation of the portal) 630. A portal component profile for the layout component 670 can represent the page layout definitions as stored in the PCD 630, and/or the JSP template 660 can be stored in the PCD 630. The page builder 600 can call an ILayoutStructure object 620, which translates this profile into the requested semantic data (e.g., the order in which the iViews should appear in the page) and provides the page builder 600 with a description of the dynamic run-time content to be obtained for the page.

The dynamic run-time content can be gathered in parallel (e.g., by using java multi-threading) to improve performance. For example, the iViews content for the page can be fetched from an iViews content gathering resource 610, which can be one or more program components that gather iViews content for the page in parallel (e.g., an iView server). The fetched content blocks can be stored in a main content storage 640 by the page builder 600 as they are obtained. The fetched dynamic content can be stored in blocks with no ordering, such as in an array of iViews' content.

The layout component 670 calls a content container tag handler 650 to pull the dynamic content from the main content storage 640 and place the dynamic content in specified position(s) in the page. For example, the tag handler 650 can call the ILayoutStructure 620 to get a list of the iViews it should include, and then turn to the main content storage 640 to get the iViews content to include in the page. With the dynamic content added, a final portal page 670 can then be sent to the page requester.

This architecture can provide improved performance at portal run-time due to the fact that fetching the dynamic

```
<%@ taglib uri="prt:taglib:com.sap.portal.reserved.layout.TagLibHtmlb" prefix="hbj" %>
<%@ taglib uri="prt:taglib:com.sap.portal.reserved.layout.TagLibLayout" prefix="lyt" %>
<%@ page import="com.sapportals.portal.useragent.IUserAgent" %>
<%@ page import="com. sapportals.portal.useragent.IUserAgentConstants" %>
<%@ page import="com.sapportals.portal.pb.layout.taglib.variabledef.RunMode" %>
<%
   RunMode pageRunMode;
   IUserAgent pageUserAgent;
   String pageUserAgentType;
%>
<lyt:template>
<%
   //Resolve page RunMode
   pageRunMode = epPageVariables.getRunMode( );
   //Resolve page UserAgent
   pageUserAgent = epPageVariables.getUserAgent( );
   pageUserAgentType = pageUserAgent.getType( ):
%>
     <hbj:content id= "myContext">
       <hbj:page title="Portal Page">
          <%
             if(pageRunMode == RunMode.RUN_TIME) {.....}
               //optionally use RunMode.DESIGN_TIME
             if(pageUserAgentType.equals(IUserAgentConstants.UA_TYPE—MSIE)) {...}
</FONT>%>
        <lyt:container id="the_container_id" />
      </hbj:page>
    </hbj:content>
</lyt:template></p>
``` content is frequently the longest phase in generating the page, as the dynamic content can be based on multiple calculations and can be dependent on the activities of multiple other applications. Thus, gathering of the dynamic content can be done in parallel and can be initiated before the layout template is even loaded (e.g., the dynamic content to be fetched can be defined in the PCD 630 independently from the template 660). When the template 660 is loaded, a parser can determine where in the container tags are, and identify the dynamic content components that belong in the page based on the content container ID(s) and using the ILayoutStructure object 620 to access the PCD 630. The fetched data can then be pulled from memory and embedded inside the locations in the page as specified by the template.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a data server), a middleware component (e.g., an application server), and a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

Although only a few embodiments have been described in detail above, other modifications are possible. The logic flows depicted in the figures do not require the particular order shown, or sequential order, to achieve desirable results. In certain implementations, multitasking and parallel processing may be preferable.

Other embodiments may be within the scope of the following claims.

What is claimed is:

1. A computer-implemented method comprising:
   providing a design-time translator and a run-time translator that both correspond to a defined page element, the run-time translator and design time translator configured on a processor;
   during design-time for a page, invoking the design-time translator for a page template including the defined page element having content components, said design-time invoking resulting in the defined page element in the page template being translated into a design-time representation of the content components in the page, the design-time representation being rendered in accordance with a predefined layout of a container for the content components, the page template being available to a plurality of remote users of a portal, the content components including a first content component and a second content component, the first content component configured as static content with a run-time behavior determinable at design-time, and the second component configured as dynamic content with a run-time behavior not determinable at run-time, such that at design-time a tag is used to represent the dynamic content on the page rendered at design-time; and
   during run-time for the page, invoking the run-time translator for the page template, said run-time invoking resulting in the content components being obtained and the defined page element in the page template being translated into a run-time presentation of the obtained one or more content components in accordance with the layout of the container, wherein the second component configured as dynamic content is determined and obtained in parallel, at run-time using threading, with other dynamic content stored in blocks without ordering in a content storage medium to render the dynamic content of the second component rather than the tag used during design-time.

2. The method of claim 1, wherein said invoking the design-time translator further results in presentation of a WYSIWYG layout editor using the design-time representation of the one or more content components in the page.

3. The method of claim 2, wherein the said invoking the design-time translator further results in client-side scripting components being included in the design-time representation to form at least part of the WYSIWYG layout editor and enable adding a content component to a content container using a drag-and-drop action.

4. The method of claim 2, wherein the page template comprises a portal page template, and the WYSIWYG layout editor comprises a WYSIWYG portal page layout editor.

5. The method of claim 4, wherein the defined page element comprises a custom Java Server Page tag and the design-time translator and the run-time translator comprise Java Server Page tag handlers for the custom Java Server Page tag, and wherein the run-time translator obtains portal dynamic content according to the portal page template and the design-time translator does not.

6. An article comprising a machine-readable storage medium storing instructions operable to cause one or more machines to perform operations comprising: providing a design-time translator and a run-time translator that both correspond to a defined page element, the run-time translator and design time translator configured on a processor;

during design-time for a page, invoking the design-time translator for a page template including the defined page element having-content components, said design-time invoking resulting in the defined page element in the page template being translated into a design-time representation of the content components in the page, the design-time representation being rendered in accordance with a predefined layout of a container for the content components, the page template being available to a plurality of remote users of a portal, the content components including a first content component and a second content component, the first content component configured as static content with a run-time behavior determinable at design-time, and the second component configured as dynamic content with a run-time behavior not determinable at run-time, such that at design-time a tag is used to represent the dynamic content on the page rendered at design-time; and during run-time for the page, invoking the run-time translator for the page template, said run-time invoking resulting in the content components being obtained and the defined page element in the page template being translated into a run-time presentation of the obtained one or more content components in accordance with the layout of the container, wherein the second component configured as dynamic content is determined and obtained in parallel, at run-time using threading, with other dynamic content stored in blocks without ordering in a content storage medium to render the dynamic content of the second component rather than the tag used during design-time.

7. The article of claim 6, wherein translating the placeholder during design-time comprises adding code enabling editing of the portal page, the added code forming at least part of the WYSIWYG portal layout editor.

8. The article of claim 7, wherein the added code comprises client-side scripting that enables addition of a content component to a content container in the portal page using a drag-and-drop action.

9. The article of claim 6, wherein the placeholder comprises a custom Java Server Page tag, said translating the placeholder during design-time comprises invoking a design-time Java Server Page tag handler corresponding to the custom Java Server Page tag, and said translating the placeholder during run-time comprises invoking a run-time Java Server Page tag handler corresponding to the custom Java Server Page tag.

10. A portal system comprising:
a processor; and
memory configured to:
    provide a design-time translator and a run-time translator that both correspond to a defined page element, the run-time translator and design time translator configured on a processor;
    during design-time for a page, invoke the design-time translator for a page template including the defined page element having content components, said design-time invoking resulting in the defined page element in the page template being translated into a design-time representation of the content components in the page, the design-time representation being rendered in accordance with a predefined layout of a container for the content components, the page template being available to a plurality of remote users of a portal, the content components including a first content component and a second content component, the first content component configured as static content with a run-time behavior determinable at design-time, and the second component configured as dynamic content with a run-time behavior not determinable at run-time, such that at design-time a tag is used to represent the dynamic content on the page rendered at design-time; and
    during run-time for the page, invoke the run-time translator for the page template, said run-time invoking resulting in the content components being obtained and the defined page element in the page template being translated into a run-time presentation of the obtained one or more content components in accordance with the layout of the container, wherein the second component configured as dynamic content is determined and obtained in parallel, at run-time using threading, with other dynamic content stored in blocks without ordering in a content storage medium to render the dynamic content of the second component rather than the tag used during design-time.

11. The system of claim 10, wherein the first tag handler interprets the portal page template by including client-side scripting that enables addition of a content component to a content container in the portal page template using a drag-and-drop action.

12. The system of claim 10, wherein the defined page element comprises a custom Java Server Page tag and the design-time translator and the run-time translator comprise Java Server Page tag handlers for the custom Java Server Page tag, and wherein the run-time translator obtains portal dynamic content according to the portal page template and the design-time translator does not.

13. A computer-implemented method for selectively interpreting a portal page layout template, the method comprising:
    providing a design-time translator and a run-time translator, the design-time translator and the run-time translator both corresponding to a same defined page element or placeholder, and being invoked based on a current mode of operation, the run-time translator and design time translator configured on a processor;
    translating a placeholder in a portal template during design-time into a representation of a container designed to present portal content using a single template file for both run-time and design-time, the container representation showing a layout context for the portal content that will be obtained and revealed at run-time, the container representation also directly presenting dynamic content source information for the content container;
    presenting a WYSIWYG portal layout editor using the container representation designed to present the portal dynamic content, the WYSIWYG portal layout editor facilitating editing of the portal template and the resulting portal page;
    obtaining portal dynamic content during run-time from a dynamic content source, the placeholder in the portal template being translated by the runtime translator into a presentation of the container containing the obtained portal dynamic content component, wherein the dynamic content is determined and obtained in parallel, at run-time using threading, with other dynamic content stored in blocks without ordering in a dynamic content source, providing a storage medium, to render the dynamic content rather than a tag used during design-time to represent the dynamic content; and
    parsing and locating, by a run-time application, the placeholders in the template and replacing them with the run-time content components, and at design-time, parsing and rendering the same template with a representation of the content components, in place of the actual run-time content components, to reveal the run-time layout during design of the template.

* * * * *